(12) United States Patent
LoPresti

(10) Patent No.: US 7,204,328 B2
(45) Date of Patent: Apr. 17, 2007

(54) POWER APPARATUS FOR WHEELCHAIRS

(76) Inventor: Edmund F. LoPresti, 160 N. Craig St., Suite 117, Pittsburgh, PA (US) 15213

( * ) Notice: Subject to any disclaimer, the term of this patent is extended or adjusted under 35 U.S.C. 154(b) by 0 days.

(21) Appl. No.: 10/873,024

(22) Filed: Jun. 21, 2004

(65) Prior Publication Data

US 2005/0279551 A1  Dec. 22, 2005

(51) Int. Cl.
*B62D 11/00* (2006.01)
*B62D 51/04* (2006.01)

(52) U.S. Cl. ............... 180/6.5; 180/19.3; 180/907; 701/1

(58) Field of Classification Search ............ 180/316, 180/65.8, 65.1, 65.2, 907, 167, 169; 318/16, 318/269, 139; 367/116, 910, 96; 382/263, 382/106, 107; 340/407.1, 825.36
See application file for complete search history.

(56) References Cited

U.S. PATENT DOCUMENTS

| | | | | |
|---|---|---|---|---|
| 3,993,154 A | * | 11/1976 | Simmons et al. | 180/65.8 |
| 3,996,950 A | * | 12/1976 | Mier | 340/407.1 |
| 4,207,959 A | * | 6/1980 | Youdin et al. | 180/167 |
| 4,260,035 A | * | 4/1981 | Loveless et al. | 180/907 |
| 4,767,940 A | * | 8/1988 | Tuttle | 180/167 |
| 4,906,906 A | * | 3/1990 | Lautzenhiser et al. | 318/269 |
| 4,931,937 A | * | 6/1990 | Kakinami et al. | 180/169 |
| 5,006,988 A | * | 4/1991 | Borenstein et al. | 180/169 |
| 5,033,000 A | * | 7/1991 | Littlejohn et al. | 180/907 |
| 5,076,384 A | * | 12/1991 | Wada et al. | 180/169 |
| 5,234,066 A | * | 8/1993 | Ahsing et al. | 180/65.2 |
| 5,270,624 A | * | 12/1993 | Lautzenhiser | 318/139 |
| 5,363,933 A | * | 11/1994 | Yu et al. | 180/169 |
| 5,497,056 A | * | 3/1996 | Kurland et al. | 180/907 |
| 5,687,136 A | * | 11/1997 | Borenstein | 367/116 |
| 5,793,900 A | * | 8/1998 | Nourbakhsh et al. | 382/263 |
| 5,807,111 A | * | 9/1998 | Schrader | 367/116 |
| 5,927,414 A | * | 7/1999 | Kan et al. | 180/65.1 |
| 6,108,592 A | * | 8/2000 | Kurtzberg et al. | 180/167 |
| 6,320,496 B1 | * | 11/2001 | Sokoler et al. | 340/407.1 |
| 6,469,956 B1 | * | 10/2002 | Zeng | 367/116 |

* cited by examiner

*Primary Examiner*—Hau Phan

(57) ABSTRACT

The disclosed invention used power-assist wheelchair hubs and an array of sensors to provide obstacle-avoidance features on a wheelchair. In a power-assisted manual wheelchair, the traditional rear wheels are replaced with motorized hubs that magnify the force applied to the rear wheels by the user. The present invention uses sensors to detect obstacles and drop-offs near the wheelchair, and uses the power-assist hubs to alter wheelchair movement in response to these sensor readings.

2 Claims, 4 Drawing Sheets

POWER APPARATUS FOR WHEELCHAIRS

FIELD OF THE INVENTION

The invention relates primarily to mobility devices for people with disabilities and secondarily to mobile robotics, and specifically to an automated obstacle avoidance device and system for a manual wheelchair.

DESCRIPTION OF RELATED ART

The American Federation for the Blind (AFB) has estimated that 9.61% of all individuals who are legally blind also use a wheelchair or scooter, and an additional 5.25% of individuals who have serious visual impairment (but are not legally blind) also use a wheelchair or scooter. Currently, most individuals who are blind and also need a mobility device are seated in a manual wheelchair and pushed by another person. Depending on the extent of useful vision, individuals with low-vision can operate an unmodified manual wheelchair, powered wheelchair or scooter, but the risk of an accident increases with increased visual impairment. There are reports of individuals using a white cane (Pranghofer 1996) or guide dog (Greenbaum, Fernandes, & Wainapel, 1998) along with a wheelchair, but this is not common practice. The proposed invention provides navigation assistance to wheelchair users with visual impairments by detecting obstacles in the environment and automatically taking action to avoiding those detected obstacles.

Electronic travel aids ("ETAs") for people with visual impairments can be categorized as primary or secondary mobility aids. A primary mobility aid is one that provides the user with sufficient information for safe travel. Guide dogs and long canes are examples of primary mobility aids. A secondary mobility aid must be used in conjunction with a primary aid, and its role is to provide additional information to the user about such things as head height obstacles and overhangs. Most, but not all, ETAs for individuals with visual impairments are secondary mobility aids. A variety of such aids exist including U.S. Pat. No. 6,469,956 which describes a handheld ultrasound obstacle detector, which provides auditory alerts of potential obstacles. U.S. Pat. Nos. 6,320,496 and 5,807,111 describe tactile interfaces to an electronic compass. U.S. Pat. No. 5,144,294 describes a system which provides information about landmarks of interest in the environment, if those landmarks have been equipped with radio-frequency markers. U.S. Pat. Nos. 5,687,136 and 3,996,950 describe ETA's which are rolled along the ground in front of a person with visual disability, detect obstacles using a variety of sensors, and provide auditory or tactile alerts to the user. The PAM-AID (Lacey et al. 1999; www.haptica.com) provides additional navigation assistance for ambulatory individuals. The PAM-AID consists of a mobile robot base to which sonar sensors, a laser range finder and a pair of handles (oriented like bicycle handles) have been added. The PAM-AID is being developed to assist elderly individuals who have both mobility and visual impairments, and has two different control modes. In the manual mode, the user has complete control over the walker. Voice messages describing landmarks and obstacles are given to the user. In the automatic mode, the device uses the sensor information along with the user input to negotiate a safe path around obstacles. The central processing unit controls motors that can direct the front wheels of the walker away from obstacles. The PAM-AID, like most ETA's, is designed for ambulatory individuals.

The Wheelchair Pathfinder (Kelly, 1999), however, is an example of a commercial product sold by Nurion Industries that can be attached to a manual or power wheelchair. The Wheelchair Pathfinder uses sonar sensors to identify obstacles to the right, left or front of the wheelchair and a laser range finder to detect drop-offs in front of the wheelchair. Feedback to the user is provided to the user through vibrations or differently-pitched beeps which requires the user to respond to the messages and take appropriate avoidance action. A number of systems have been developed that provide navigational assistance to power wheelchairs, but those systems are not adaptable to manual wheel chairs that have a power assist component.

Unlike the Wheelchair Pathfinder which relies on the user to take corrective action, the present invention, upon detecting an obstacle, alters the speed and/or direction of the wheelchair. Further, the present invention has superior sensor coverage to the systems currently used in conjunction with a manual wheelchair extension or a power wheelchair.

A number of systems have been developed which provide navigation assistance on power wheelchairs. Two North American companies, KIPR (Lindsey Square, Bldg. D; 1818 W. Lindsey Dr.; Norman, Okla. 73069) and Applied AI (Suite 600; 340 March Road; Kanata, Ontario; Canada K2K 2E4), sell smart wheelchair prototypes for use on power wheelchairs. The CALL Center (callcentre.education.ed.ac.uk/Smart_WheelCh/smart_wheelch.html) of the University of Edinburgh, Scotland, has developed a power wheelchair with bump sensors and the ability to follow tape tracks on the floor for use within a wheeled-mobility training program (Nisbet et al. 1995). Permobil (www.permobil.se/) offers an add-on module for some of its power wheelchair models that can follow tape tracks on the floor and makes use of sonar sensors to stop the chair before colliding with obstacles, but this system is only compatible with Permobil wheelchairs, and is limited in the types of obstacles that can be detected. All the above devices were designed for electric powered wheelchairs rather than manual wheelchairs, whereas the invention described herein is deigned for use on a manual wheelchair frame, using the pressure exerted by the user on the pushrims to determine the desired path of travel.

Several existing patents described wheelchairs or similar mobility devices with obstacle avoidance features. U.S. Pat. No. 5,006,988 uses sensor data to compute an array of vectors which indicate a safe path among environmental obstacles. This vector-based path selection method is not used in the system described here. The vector-based approach requires a larger number of sensors and more processing capability then the approach used by the described invention, and therefore the vector-based systems are not as cost-effective as the present invention. U.S. Pat. Nos. 5,363,933 and 6,108,592 use voice- or breath-based commands to control a power wheelchair with obstacle-detecting sensors, and U.S. Pat. No. 5,497,056 uses a pushbutton interface to control a chair with obstacle-detecting sensors. In contrast, the present invention uses input from the wheelchair pushrims rather than the user's voice or pushbuttons. Finally, U.S. Pat. No. 5,793,900 uses image processing to generate categorical depth maps using passive defocus sensing. In contrast, the present invention does not rely on vision analysis or passive defocus sensing. Although others have attempted to address mobility problems of visually impaired users of manual wheelchairs, none of the prior art describe or disclose se patents describe systems which incorporate power-assist wheels to provide obstacle avoidance features on a manual wheelchair. Power-assist wheels have only recently become available, and have not previously been used as the basis for a manual wheelchair with navigation assistance features.

In a power-assisted manual wheelchair, the traditional rear wheels are replaced with motorized hubs that serve to magnify the force applied to the rear wheels by the user. Power-assist hubs meet the mobility needs of a population of users that (1) need a mobility aid, (2) lack the upper-body strength or function to propel a manual wheelchair, and (3) do not want a powered mobility device. A number of U.S. patents describe power-assist wheels. However, none of these systems provides obstacle avoidance features or incorporates environmental sensors.

Many systems which provide navigation assistance features have been developed based on power wheelchair bases. However, no systems exist for a manual wheelchair frame which can autonomously act to avoid collisions with obstacles. Because the present invention is based on a manual wheelchair frame, it is smaller, lighter and easier to transport than a power wheelchair with similar navigation assistance features. The present invention also allows a user to retain or improve arm function by encouraging continued use of one or both arms.

The present invention differs from existing navigation-assist wheelchairs by providing haptic feedback to the user through the force applied to the rear wheels via the power assist hubs. Thus, the visually impaired user receives a "picture" of his or her environment through the compliance/stiffness of the rear wheels in different directions of travel. The control software of the present invention also differs from traditional mobile robot or navigation-assist wheelchair obstacle avoidance techniques in that the manual wheelchair receives momentary "ballistic" control signals rather than continuous control signals from a joystick.

Unlike ETA's which provide auditory or tactile alerts of potential obstacles, the present invention actively prevents collisions after an obstacle is detected.

The present invention will benefit individuals with hemiplegia, a condition which is often caused by stroke or a spinal cord injury. Hempligia refers to paralysis of one side of the body; for example, of the right arm and right leg. Currently, hemiplegic individuals using a manual wheelchair must use a wheelchair in which the rear wheels are mechanically linked. This does nothing to decrease the amount of force that must be applied to move the wheelchair, but does make it necessary to decouple the rear wheels each time a turn is made. The present invention will serve as an "intelligent one-arm drive" which allows one wheel to automatically match the force applied to the other wheel, and automatically performs course corrections that would otherwise require decoupling the wheels.

In addition, the present invention is useful for individuals who experience difficulty in moving a wheelchair inside a van, or in other confined spaces such as elevators and bathrooms.

It is an object of the present invention to provide a means for visually impaired manual wheelchair users to avoid obstacles without the intervention of the wheelchair user.

It is also an object of the present invention to provide a means for allowing mechanically linked wheels of a manual power-assisted wheelchair to perform a course correction independent of the linked wheel.

It is an object of the present invention to provide a means for any mechanical device or system to have an automated correction function.

SUMMARY OF THE INVENTION

The disclosed invention uses power-assist wheelchair hubs and an array of sensors to provide obstacle-avoidance features on a manual wheelchair.

In a power-assisted manual wheelchair, the traditional rear wheels are replaced with motorized hubs that serve to magnify the force applied to the rear wheels by the user. As with the existing power-assist wheelchair hubs, the invention utilizes instrumented wheelchair pushrims to detect user input (i.e., pressure applied to the pushrims) and the motors in the hubs provide amplified movement when the environment is clear. However, the present invention also provides active braking in the presence of obstacles. Modular sensors detect obstacles (such as furniture or walls) and drop-offs (such as descending staircases or curbs) in the environment. Information from these sensors is provided to central control circuitry (including a microprocessor and motor driver) which decides whether an obstacle is present, and what action if any must be taken in response. The control circuitry then overrides the power-assist motors, activating their brakes. These brakes are typically used to regulate the speed of the wheelchair (e.g. when descending a steep ramp) but are used in the present invention also to prevent collisions.

The present invention is able to sense (1) the propulsive force applied to each rear wheel of the wheelchair, (2) the magnitude and velocity of rotation of each rear wheel, and (3) the location of obstacles and drop-offs relative to the wheelchair. Information from all sensors is collected by a microprocessor which: (1) integrates information about the user's input and the surrounding environment, (2) determines whether there is a risk of collision and adjusts the command signal accordingly, and (3) passes the resulting command signals to the motors of the power-assist hubs.

The present invention can have several types of sensors integrated therein. These sensors are used for tracking the state of the wheelchair and locating obstacles and drop-offs in the wheelchair's environment. Examples of sensors to track the state of the wheelchair are encoders to measure wheel velocity. Examples of sensors for locating obstacles and drop-offs in the environment could include sonar sensors, infrared range-finders, contact switches for bump detection, laser range-finders, or sensors that rely on imaging techniques.

The invention's control software provides smooth travel while modifying the direction and speed of travel of the wheelchair to avoid obstacles. The control software combines a power-assist control algorithm (to translate user input into signals to the power-assist motors) with obstacle avoidance software designed for navigation-assist power wheelchairs (LoPresti et al. 2003).

Additional features, advantages, and embodiments of the invention may be set forth or apparent from consideration of the following description and drawings. Moreover, it is to be understood that both the foregoing summary of the invention and the following detailed description are exemplary and intended to provide further explanation without limiting the scope of the invention as claimed.

DETAILED DESCRIPTION OF THE PREFERRED EMBODIMENTS

Figure 1A:
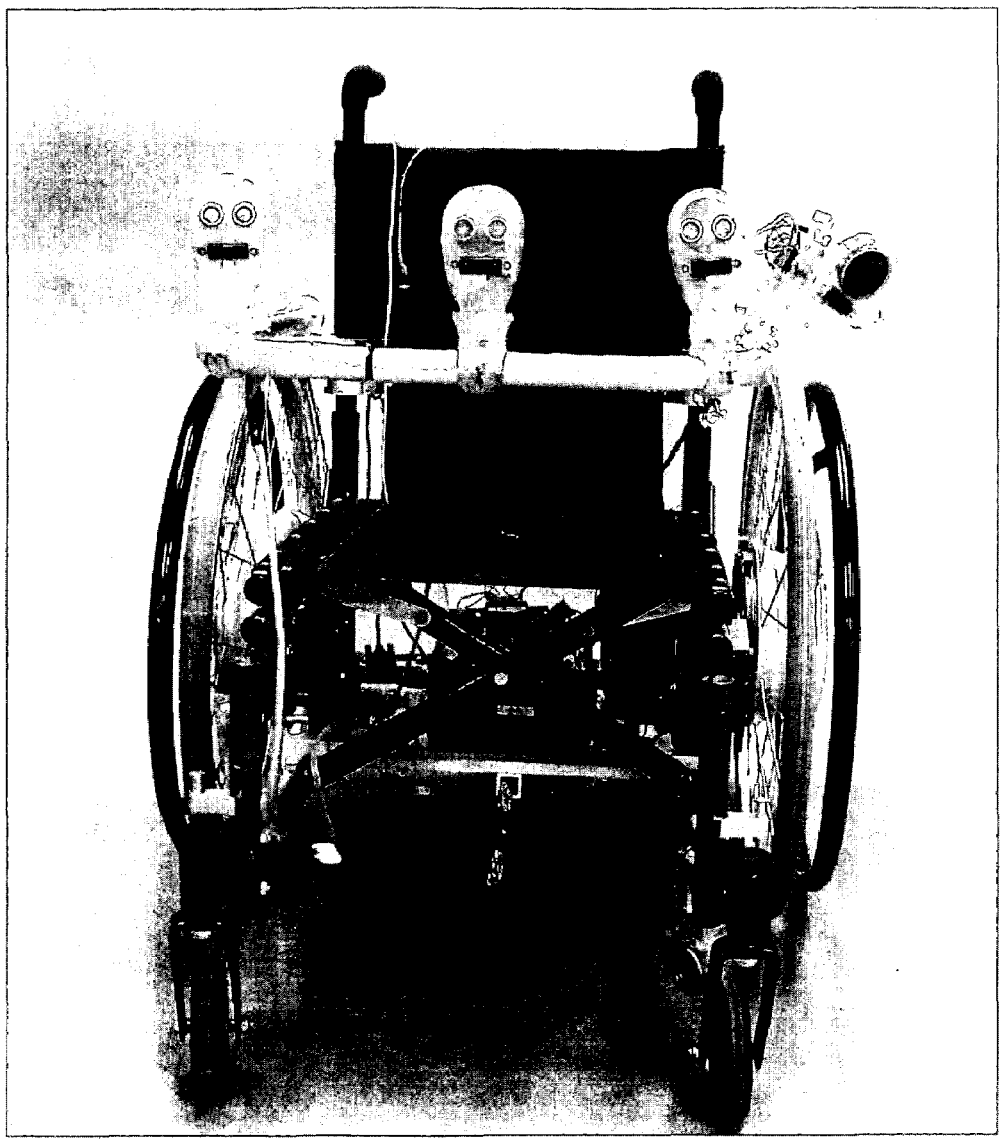
FIG. 1 is a schematic diagram showing the hardware parts of each wheel.
Figure 1B:
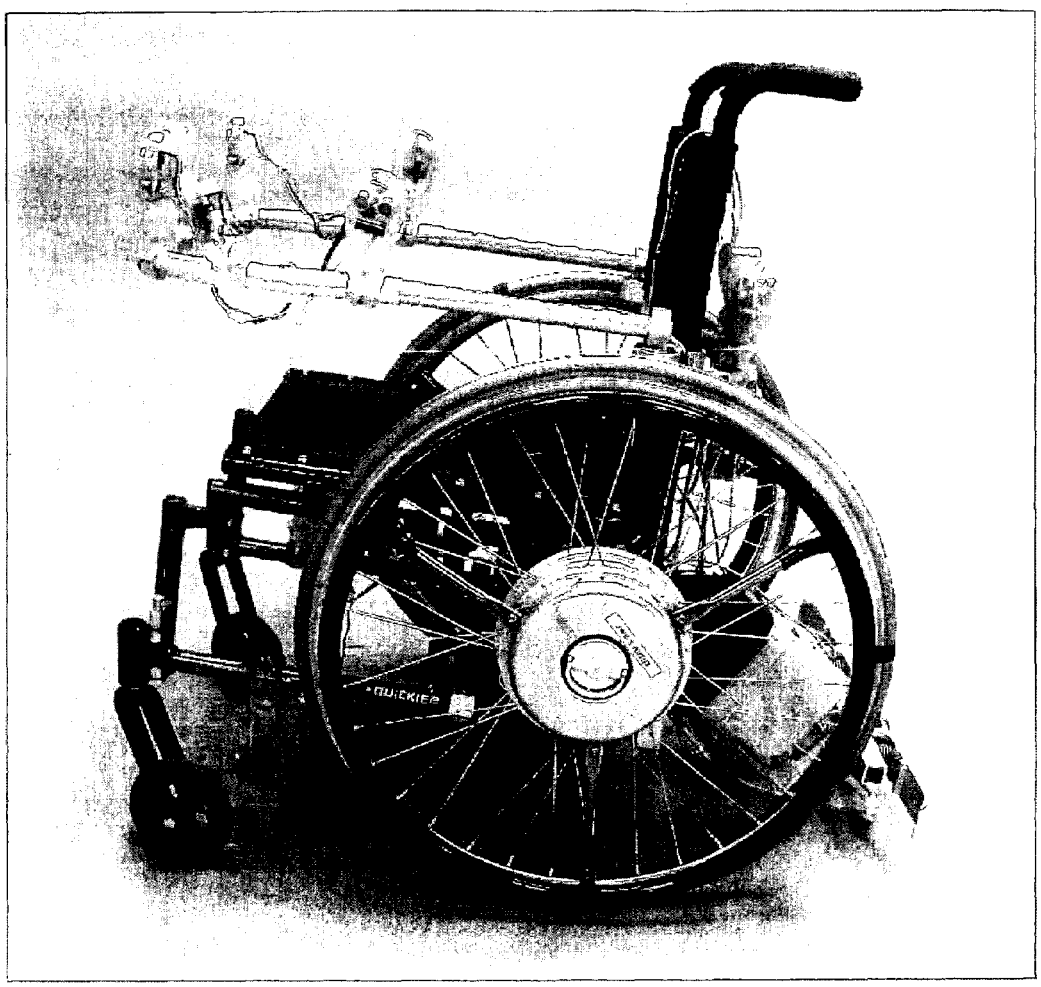
Figure 2:
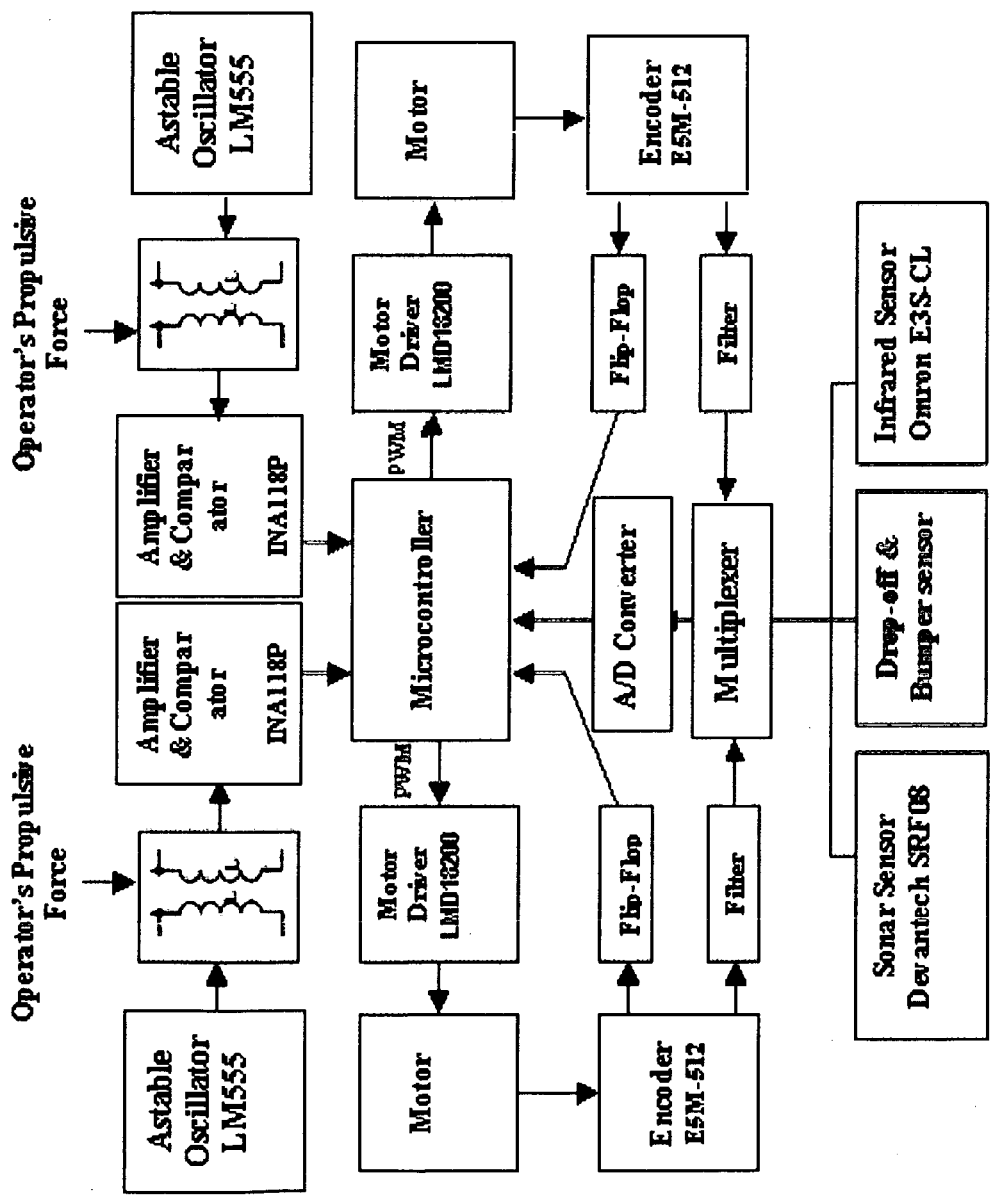
FIG. 2 depicts an overview of a preferred embodiment of the present invention as applied to a power-assisted wheelchair.

An embodiment of the present invention is shown in FIG. 1 mounted on a commercially available manual wheelchair frame. This embodiment uses the instrumented pushrims of a commercially available power-assist wheelchair hub to sense the propulsive force applied to each rear wheel of the wheelchair. The instrumented pushrims measure these propulsive forces using linear compression springs and a simple potentiometer that senses the relative motion between the pushrim and the hub. The pushrim signals are provided to the system's control electronics, which are based upon an electronic board interfaced to a custom printed circuit board design. In a preferred embodiment, this microprocessor is substituted for the microprocessor which typically coordinates the power-assist hubs. The microprocessor controls a permanent magnet direct-current motor attached to each rear wheel. The control signal provided to the motor by the microprocessor is determined by the signals received from the pushrims and other sensor information (e.g., information related to obstacles in the environment). An overview of the interaction between the microprocessor, the pushrim sensors, the motors, and the obstacle-detecting sensors is shown in the block diagram in FIG. 2.

Several types of sensors are integrated into the device. Sensors can include a propulsive force sensing circuit which detects forces applied to the wheelchair pushrim, a speed and direction identification circuit which measures the speed of the motors, and a collection of obstacle avoidance sensors which monitor the environment for potential obstacles. The present invention includes at least one propulsive force sensor and at least one type of obstacle avoidance sensor. A preferred embodiment, described herein, uses a sensor to detect the speed and direction of the hub motors is and to provide additional information for the navigation assistance software.

Information from all sensors is collected by the microprocessor, which integrates information about the user's input and the surrounding environment, and passes command signals to the motor drivers.

The propulsive force sensing circuit detects forces applied to the wheelchair pushrim. The torque applied to the rear wheels is translated into a voltage. The voltage output from the potentiometer circuit on the rotating portion of the wheel is transmitted to the stationary portion of the wheelchair. The output signals of the secondary (stationary) coil is sent to an AC/DC converter, and the DC component is sent to an instrumentation amplifier. This electronic circuit is used for sensing the user's intended speed and direction of each rear wheel.

While the pushrim sensors indicate the user's intended speed and direction of movement, the speed and direction identification circuit measures the actual speed of the motors. The actual velocity of each DC motor is detected by optical encoders mounted to the transmission gears of the motor. For speed detection a high-frequency filter is employed in which the capacitive reactance value increases or decreases depending on the encoder signal frequency. The output of the filter is interfaced to the A/D converter of the microcontroller through a multiplexer.

Obstacle avoidance sensors in a preferred embodiment include seven standard sonar sensors, one wide-angle sonar sensor, seven infrared range finders, and four contact switches. Each of the foregoing sensors is used to detect potential obstacles in the wheelchair user's environment. In addition to detecting obstacles (such as walls or furniture), the sensors can be used to detect drop-offs (such as descending staircases or curbs) by observing the absence of an object (i.e., the ground).

In this embodiment, a combination of sonar and infrared sensors are used to capitalize on the strengths and overcome the weaknesses of each sensor modality, and therefore provide redundancy. Sonar sensors tend to have a longer range and wider detection angle. Infrared range finders provide better resolution at shorter distances. Infrared range finders have difficulty detecting dark-colored or clear surfaces, while sonar sensors have difficulty detecting smooth surfaces. Having both sensor types available increases the range of materials which can be detected. Contact switches are included as a further source of redundancy. If an obstacle is undetected by the sonar and infrared sensors and the wheelchair collides with the obstacle, contact with the front or rear bumpers will activate one or more switches and immediately prevent further movement in the direction of the obstacle, reducing potential damage.

A collection of sonar and infrared sensors such as those depicted in a preferred embodiment detects obstacles as large as a wall or as thin as 2.5 cm in width. A drop-off detector consisting of infrared and wide-beam sonar sensors detect drops as shallow as 5 cm (the height of a common curb which should be navigable by the wheelchair) while still allowing travel down a ramp with angle of descent less than 20°. The modular nature of the present invention allows more sensors to be added to provide even greater detection. In some preferred embodiments, the number of sensors are limited in number to reduce the cost of the system. The modular nature of the system of the present invention also allows other sensor modalities to be used; including, but not limited to laser scanners, laser strip detectors, short-range radar, or a global positioning system.

In one preferred embodiment, three sonar and three infrared sensors are mounted to an auxiliary aluminum bar which is attached to the armrests and extends in front of the wheelchair. Two standard sonar, two infrared, and one wide-angle sonar sensor are attached to the wheelchair backrest and monitor the rear of the chair. Two sonar and two infrared sensors are mounted to the frame of the wheelchair near the footrests, and monitor the corners of the wheelchair. The contact switches are mounted in two custom-made footrest extensions and a rear bumper. This arrangement provides basic coverage of all sides and corners of the wheelchair. Other arrangements of sensors can be based on the needs of a particular user.

Data from all analog sensors (pushrim sensors, motor encoders, sonar obstacle sensors, and infrared obstacle sensors) are passed to the microcontroller by an analog to digital convertor through a multiplexer. The interface between the sensors and the microcontroller allows for a modular system of sensors, which can be customized to the number, type, and arrangement of sensors which is best for an individual user. This system could also be extended to include other sensor types, such as laser rangefinders or computer vision.

The control electronics provide sensor interfacing and a power amplifier for the motor drives. The microcontroller runs the embedded system software, described below. Voltage regulators provide voltage supply lines to the sensors, motors, and other electronic components. Some preferred embodiments include either a single nickel-cadmium battery (NiCd) or a nickel-metal hydride battery (NIMH) as the power supply. Other embodiments use other power sources.

The control electronics for one preferred embodiment include an H-bridge motor driver. The microcontroller sends PWM (Pulse Width Modulation) control signals to a pair of H-Bridge drivers designed for motion control applications. Each H-Bridge driver controls a motor with a rare earth magnet. Each motor is attached to a ring gear, with a resulting gear reduction.

The motor control signals provided by the microcontrollers are determined by the sensor signals in accordance with the system's embedded control software. This software is designed to share control of the wheelchair with the wheelchair operator. The wheelchair operator is responsible for choosing when—and in which direction—the wheelchair moves, while the software modifies the speed of the wheelchair based on the proximity of obstacles in the wheelchair's current direction of travel.

The navigation assistance software runs on the microprocessor. The software reads the values of the pushrim sensors, motor encoders, and obstacle avoidance sensors. If an obstacle is detected and the wheelchair is moving or turning toward it, the software adjusts the signal to the hub motors to avoid a collision.

Figure 3:
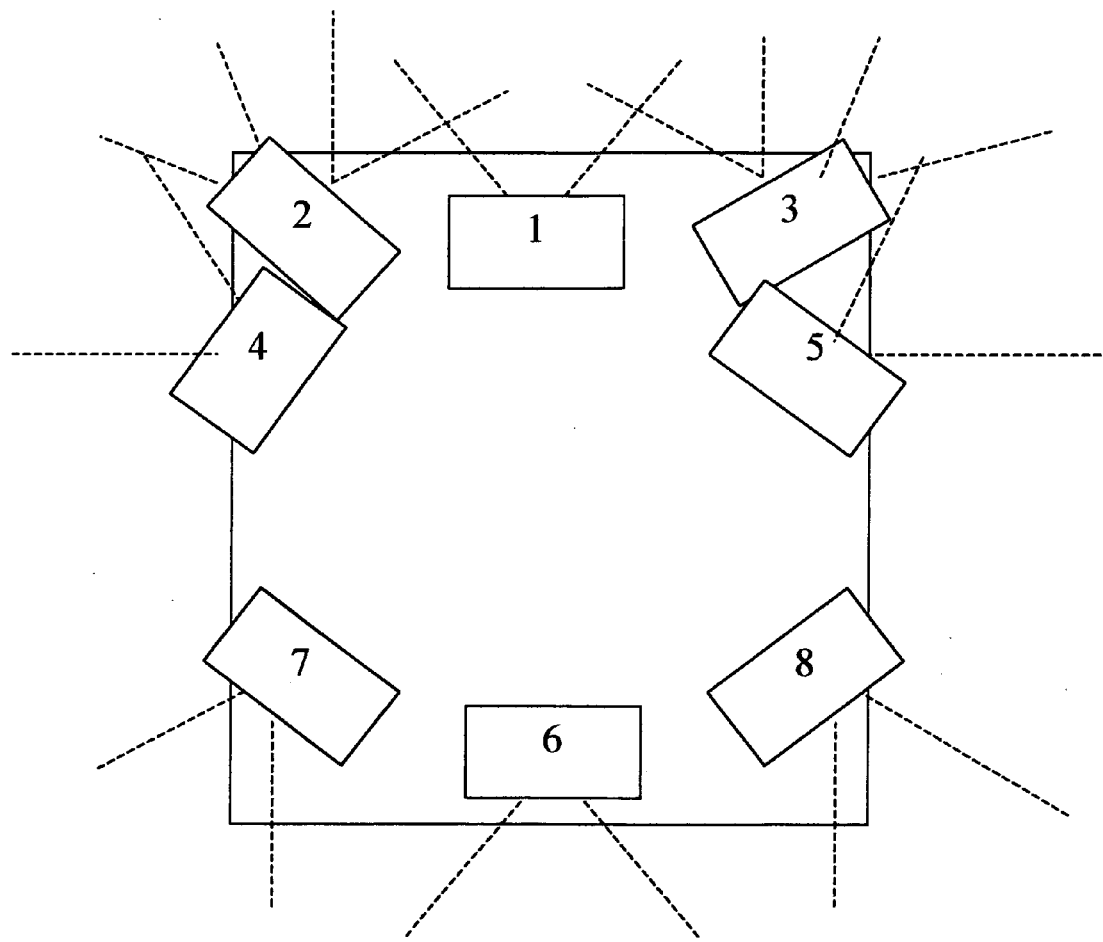
FIG. 3 depicts placement of sensor modules for a preferred embodiment on a manual wheelchair frame.

Decisions about collision risk based on sensor data are made using a case-based decision method for interpreting sensor data and wheelchair speed and direction of travel. Data from each sensor is compared to a voltage threshold for that sensor. These thresholds are different for each sensor, depending on the type of sensor (sonar or infrared), the position of the sensor (e.g. the front sensors must look beyond the footrests, while the rear sensors are at the edge of the chair), and the orientation of the sensors (e.g. whether the sensor beam is directed along the path of the wheelchair or at an angle). If an obstacle is detected and the wheelchair is moving or turning toward it, the software adjusts the motor signal to avoid a collision by slowing or stopping the wheelchair's movement in that direction. Example cases and wheelchair responses are listed in Table 1, where sensor numbers are based on FIG. 3. It would be consistent with this case-based decision method for the software to detect features of the environment, including but not limited to hallways, curbs, or doorways, and alters its navigation assistance in ways intended to be appropriate to said environmental features.

In addition to or in place of the case-based decision method, the system could use Hidden Markov Model techniques to interpret sensor data and wheelchair speed and direction of travel in order to determine the risk of collision.

Tactile feedback is provided to the user as the wheelchair resists movements which would cause collision with obstacles. Auditory and visual methods to provide feedback about the presence and location of obstacles are compatible with the system electronics. The invention includes a user override mechanism that allows the user to quickly and easily disengage the obstacle avoidance feature in an emergency.

TABLE 1

Example cases for wheelchair response to obstacles.

| Case | If the pushrim signal indicates: | And the sensors indicate: | Wheelchair response |
| --- | --- | --- | --- |
| Obstacle in front of chair | Forward movement | Sensors 1, 2, or 3 exceed "stop" threshold | Prevent forward movement. |
| Obstacle behind chair | Backward movement | Sensors 6, 7, or 8 exceed "stop" threshold | Prevent backward movement |
| Obstacle at right, left is clear | Turning right | Sensors 3 or 5 exceed "stop" threshold | Turn left, away from obstacle |
| Obstacle at left, right is clear | Turning left | Sensors 2 or 4 exceed "stop" threshold | Turn right, away from obstacle |
| Obstacles at both sides | Turning either direction | One of sensors 2, 4, or 8 AND one of sensors 3, 5, or 7 exceed "stop" threshold | Prevent turning. |

What is claimed is:

1. A power-assisted manual wheelchair comprising:
   (a) means for detecting forces applied to each power-assisted wheel pushrim to determine a user's desired direction and speed of travel;
   (b) at least one sensor capable of detecting obstacles and environmental voids;
   (c) means for controlling a motor and brake to each power-assisted wheel; and
   (d) a controller that
      (i) receives and processes information about the detected forces applied to each power-assisted wheel pushrim and about the detected obstacles and environmental voids from said sensor;
      (ii) determines the user's risk of collision with the detected obstacles; and
      (iv) alters the forces applied to said wheel pushrims to avoid the user colliding with said detected obstacles.

2. A power-assisted manual wheelchair comprising:
   (a) means for detecting forces applied to a power-assisted wheel pushrim to determine a user's desired direction and speed of travel in said wheelchair;
   (b) a plurality of sensors capable of detecting obstacles and environmental wherein such sensors are selected from a group consisting of ultrasound sensors, infrared sensors, laser range finder sensors, touch sensitive sensors and imaging based sensors;
   (c) means for controlling a motor and brake to each power-assisted wheel; and
   (d) a controller that
      (i) receives and processes information about the detected forces applied to each power-assisted wheel pushrim and about obstacles and environmental voids detected by said plurality of sensors;
      (ii) determines the user's risk of collision with the detected obstacles; and
      (iii) alters the forces applied to said wheel pushrims for the user to avoid colliding with said detected obstacles.

* * * * *